Nov. 27, 1956 J. R. MATTHEWS 2,772,076
CATALYST FLOW DISPERSION DEVICE
Filed Oct. 16, 1953

INVENTOR
John R. Matthews
BY Everett A. Johnson
ATTORNEY

United States Patent Office 2,772,076
Patented Nov. 27, 1956

2,772,076

CATALYST FLOW DISPERSION DEVICE

John R. Matthews, Chicago, Ill., assignor to Standard Oil Company, Chicago, Ill., a corporation of Indiana Application October 16, 1953, Serial No. 386,520

6 Claims. (Cl. 257—224)

This invention relates to a method and means for dispersing a suspended stream of solids upwardly through a tubular contactor such as a catalyst cooler.

It has a long been recognized that a mass of finely divided solid materials can be carried upwardly by a gasiform fluid to provide a fluidized bed of finely divided solid materials and to provide intimate contact of the fluids and the finely divided solids. It has also been proposed that such a fluidized mass be divided into a plurality of columnar bodies for the purpose of indirect heat exchange. However, it has been observed that in supplying a heterogeneous suspended mixture of finely divided solids and carrier gas from a single conduit into a plurality of parallel tubular conduits, there is unequal distribution of the finely divided solids and of the gases across the bundle of tubes.

The solids in this heterogeneous mixture exhibit their own special flow characteristics while the gasiform fluid component behaves in an entirely different manner. For example, when a flowing solid emerges from a pipe section of small diameter to a conduit concentrically of larger diameter, such as a bundle of tubes, the solids obey the laws of motion and continue in their normal path as was restricted in the smaller pipe. The fluid, being less dense reaches the peripheral area of the larger conduit in preference to the solid particles. This phase separation, although not sharp, gives a variable solids-to-fluid distribution across the larger conduit or bundle with more solids flowing through the center tubes and the majority of the fluid through the outer or peripheral tubes.

The solids flowing through the center tubes, being the denser material, causes a greater static pressure drop than the fluid at the outer tubes. Therefore, the fluid in the outer tubes must make up in velocity the pressure drop difference in static head caused by the more dense solids in the central tubes, which means a greater velocity for the fluids in the outer tubes of the cooler than in those near the center. This flow maldistribution causes many complications.

Improper or non-uniform distribution increases the erosion of the outer tubes of the contactor due to the fact that the erosion factor varies approximately as the cube of the velocity and the first power of the density. Likewise, the tube sheet is subjected to severe erosion. Furthermore, the uneven flow through the heat exchanger causes variance in heat transfer through the tubes since the velocity, the heat capacity and the exit temperatures of the flowing stream will vary from tube to tube.

It has heretofore been proposed to minimize the defects outlined above by employing a grid or perforated plate for distributing the finely divided solids and for introducing the gasiform fluid at uniformly spaced points across the flow area of the contacting vessel. Nevertheless, contactors for fluidized masses of finely divided solids of this general type have suffered from a number of major difficulties. In addition to inlet and grid fouling, erosion of the grid orifices, of the tube bundle and of the tube sheet has been severe. Moreover, a grid causes a significant pressure drop which varies as the erosion proceeds. Another disadvantage is that finely divided solids may collect on the upper surface of the grid or plate and further alter its pressure drop and flow characteristics across the grid.

These difficulties are especially pronounced in a catalyst cooler of a fluid catalytic cracking unit. Such a catalyst cooler is used for the purpose of cooling the catalyst and recycling it to the regenerator for temperature control therein. In most instances the catalyst, e. g., finely divided clay, silica, alumina and the like, and air flow through a pipe of small diameter and emerge into tubes of a cooling section bundle in a larger diameter pipe. The large pipe does not necessarily have a larger net flow area than the small pipe, since a tube sheet extends across the bundle diameter with tubes in which the catalyst and gas flow for heat exchange purposes with a liquid in the tank surrounding the tubes.

It is, therefore, an object of this invention to provide a method and means for introducing heterogeneous mixtures of gasiform fluids and solids uniformly across the entire flow area of a contacting chamber. Another object of the invention is to provide a method and means for supplying such heterogeneous mixtures to a bundle of parallel tubes with a minimum erosion of the tubes located on the periphery of the bundle. A further object is to provide a contacting chamber which permits effective and controlled contact of finely divided solids and gasiform fluids with a minimum pressure drop due to the uneven flow of finely divided solids through the tubes. An additional object is to provide an apparatus which is simple in construction and which can be installed in existing units without modification thereof.

A more specific object of the invention is to provide an improved catalyst cooler wherein effective heat transfer from a fluidized heterogeneous mixture of finely divided solids and gasiform fluids is obtained with a minimum of erosion of the tube sheet and peripheral tubes. Other objects will become apparent as the detailed description thereof proceeds.

Briefly, I attain the objects of my invention and eliminate the described difficulties by providing an inverted truncated conical baffle containing a plurality of radially extending vanes which are centrally fixed to a depending mast which is supported by the bottom tube sheet in the contactor. The truncated conical baffle is placed below the inlet of the large conduit and is constructed so that the catalyst-air mixture is evenly dispersed so as to maintain continuous uniform flow through the tubes. The catalyst strikes the conical baffle and is directed outward and upward along the baffle whereby the heterogeneous mixture of solids and fluids is uniformly distributed across and within individual tubes of the contactor.

The details of construction and configuration of the apparatus will become apparent taken with the accompanying drawing wherein.

Figure 1:
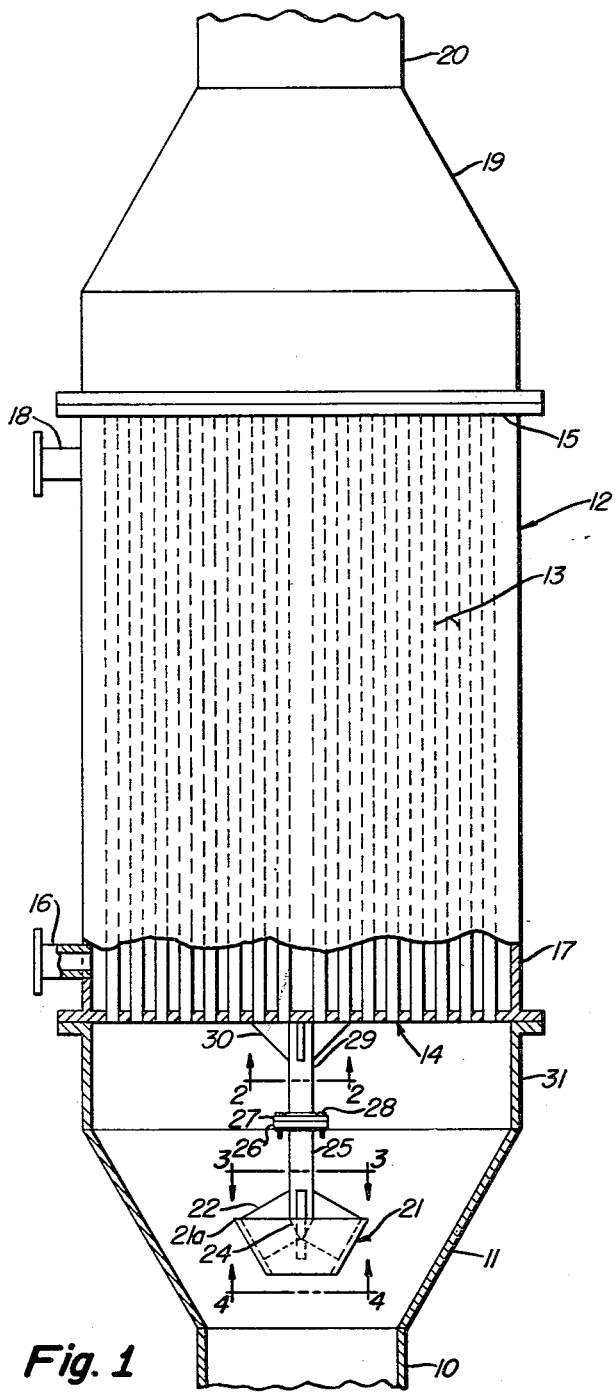
Figure 1 is an elevation of a tubular contactor employing my truncated conical dispersing baffle.

Referring to the drawing, my invention comprises an inlet line 10 merging with a tapered section 11 which is flared upward and outward to the full diameter of the contactor 12 a distance below the main body of the contactor or cooler 12 which is formed of a bundle of tubes 13 between the lower tube sheet 14 and the upper tube sheet 15 in a shell 17. These tubes 13, in a typical installation, may be from about 1 inch to 3 inches in diameter. They are surrounded by a cooling liquid such as water which may be introduced into shell 17 through line 16.

The heat extracted from the heterogeneous mixture of gases and solids flowing in tubes 13 converts the water to steam which is withdrawn from line 18. The stream of gases and solids from the individual tubes 13 are collected in the upper tapered reduction section 19 and are withdrawn from transfer conduit 20.

The dispersing unit 21 is in the form of a truncated cone with a plurality of radially extending spacer plates 22. The angle of the cone or dispersing plate 21 should be at about 60° to the tube sheet 14 and substantially parallel to the sloping walls 11. However, the angle formed by the conical distributing cone 21 will ordinarily vary between about 50° and 75°.

An important advantage of this type of dispersion plate 21 is to attain uniform distribution of the solids as well as of the carrier gas. Further, it has been established that erosion of the tube sheet 14 and of the tubes 13 is greatest when impingement by the heterogeneous stream is at an angle substantially less than 90°. The conical dispersion surface deflects the heterogeneous stream toward the outer edge 21a of the cone 21. The dispersion member 21 is spaced below the bottom tube sheet 14 a substantial distance.

A solid spear-head cone 24 deflects the central portion of the heterogeneous stream, the spearhead cone 24 having surfaces which parallel the surfaces of the dispersion member 21. In this manner, the bulk of the solids discharged from the conduit 10 will be deflected to the peripheral tubes 13 in the bundle and a minor portion will flow through the center tubes of the bundle. By so distributing the stream to the peripheral tubes 13, a balanced condition is maintained throughout all of the tubes regardless of the position within the bundle. This balance of operation likewise reduces erosion by reducing the viscosity of flow through any tube or group of tubes.

Figure 2:
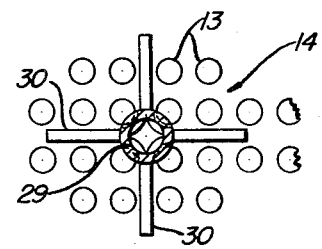
Figure 2 is a view along the line 2—2 in Figure 1.

The dispersion unit 21 is mounted on a lower section 25 of a mast which depends from the bottom tube sheet 14. The mast section may, for example, comprise a pipe having a flange 26 which is secured by bolts 28 to fixed flange 27 which is, in turn, carried by the longitudinally extending mast section 29. This latter section 29 is secured to the bottom tube sheet 14 by triangular gusset plates 30 as shown in Figures 1 and 2. The end of the pipe is swaged between the gussets 30 so as to clear the inlets of the tubes 13.

Figure 3:
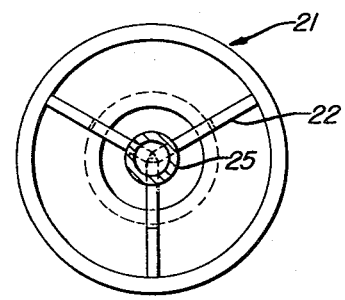
Figures 3 and 4 are top and bottom views, respectively, of one embodiment of the truncated conical baffle of Figure 1.
Figure 4:
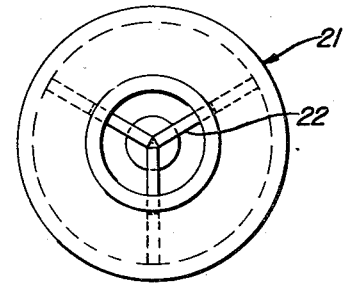

In a typical contactor of the type described, the chamber 12 may be about 7 feet in diameter. The inlet conduit 10 may be about 3 feet I. D. and the outlet of transfer line 20 of a corresponding size. The individual tubes 13 within the shell 17 may be about 19 feet in length and about 1.875 inches O. D. About 580 of these tubes 13 may be symmetrically arranged between the tube sheets 14 and 15 on a square pattern. The dispersing cone 21 has a maximum diameter or base of about 18.5 inches with a cone height of about 9 inches giving a slant height of about 10.5 inches. The spacer plates 22 are welded at one end perpendicular to the inner surface of the truncated cone 21 and the other end of each plate 22 is welded to the spear-head cone 24 and to the mast section 25 to present the configuration illustrated by Figures 1, 3 and 4.

A skirt 31 depends about 20 inches below the bottom tube sheet 14 thereby placing the dispersion unit 21 a distance of about 3.5 feet to 4 feet below the tube sheet 14. The fixed flange 27 secured to the upper mast section 29 is about 18 inches from the bottom tube sheet 14 and the lower mast section 25 is about 18 inches along.

In general, a velocity below about 20 feet per second will not permit a stable fluid flow through the cooler tubes 13. Conversely velocity flow above about 35 feet per second causes excessive erosion. However, by the use of my catalyst dispersing cone 21 stable fluid flow can be obtained at the lower end of this range of between about 20 feet and 35 feet per second, thereby obtaining optimum heat transfer rates, reducing erosion to a minimum, and substantially eliminating the by-passing of any tubes or group of tubes due to unequal distribution of solids and gases across the bundle of tubes.

Although I have described my invention in terms of a specific example, which is set forth in some detail, it should be understood that this is by way of illustration only and that the invention is not limited thereto. Alternative embodiments of the apparatus and in the operating techniques will become apparent to those skilled in the art in view of my description. Accordingly, modifications of my invention are contemplated without having departed from the spirit of the described invention.

What I claim is:

1. An apparatus for controlling the upward flow of a heterogeneous stream of gasiform fluids and finely divided solids through a bundle of parallel vertical tubes between an upper tube sheet and a lower tube sheet in a shell which comprises in combination a depending skirt below said lower tube sheet, an inverted hollow truncated conical deflecting member wholly below said skirt, a centrally located depending mast means fixed to the lower tube sheet of said bundle, an inverted spearhead cone carried by the lower end of said mast, and a plurality of radially extending spacer plates fixed to the interior of said conical member and to said mast, the base of said spear-head cone and the base of said truncated conical member being in horizontal alignment and the surfaces thereof being parallel.

2. The apparatus of claim 1 wherein the conical deflecting member is disposed at an angle of between about 50° and 75° with respect to the lower tube sheet.

3. In an apparatus for flowing a heterogeneous stream of gasiform fluids and finely divided solids through a bundle of parallel tubes, the improvement which comprises a cylindrical skirt extending axially below said bundle, a hollow truncated conical deflecting member having its base toward said bundle and disposed below said skirt, a separable mast means extending through said skirt for centrally supporting said member axially of said bundle therebelow, said mast means including at least three radially extending spacer plates between the interior of said member and the exterior of said mast, a spear-head inverted cone fixed to the upstream lower end of said mast, and means for fixing said mast means in such axial alignment with said bundle.

4. An apparatus for effecting the uniform distribution and flow of a heterogeneous stream of gas and finely divided solids through a plurality of parallel tubes which comprises a central mast extending axially of said tube bundle, said mast being sectioned to permit the separation of the lower end thereof, a deflector member carried by said mast, said member comprising an inverted hollow truncated conical section, a spear-head cone on the lower end of said mast, the slope of the outer surface of said cone and the inner surface of said member being parallel, and a plurality of radially extending spacer plates supporting said hollow conical member concentrically with respect to said mast and to said spear-head cone.

5. The apparatus of claim 4 wherein the surfaces of said spear-head cone and of said deflecting member are parallel to each other and are disposed at an angle of about 30° with respect to the axis of said mast.

6. An apparatus for controlling and directing the flow of a heterogeneous stream of gasiform fluids and finely divided solids uniformly through a bundle of parallel tubes supported between an upper tube sheet and a lower tube sheet in a shell which comprises in combination a tubular skirt extending axially of said bundle, the flow area of said skirt being substantially coextensive with the flow area of said bundle, an inlet conduit of substantially smaller diameter than said bundle arranged below said bundle, a flared merging section between said conduit and the lower end of said skirt, a sectioned mast depending axially of said bundle from said tube sheet, a spear head consisting of an inverted cone fixed to the lower end of said mast, an inverted hollow truncated conical deflecting member supported by said mast within said merging section wholly below said skirt, said deflecting member being of substantially smaller lateral dimensions than said skirt and said merging section, the outer surface of said truncated member being substantially parallel to the slope of the said merging section and the inner surface of said hollow truncated member being substantially parallel to the slope of the outer surface of said spear head cone.

References Cited in the file of this patent

UNITED STATES PATENTS

| | | |
|---|---|---|
| 1,071,381 | Anthony | Aug. 26, 1913 |
| 2,602,647 | Miller | July 8, 1952 |
| 2,611,685 | Yoder | Sept. 23, 1952 |